US 9,223,553 B2

(12) United States Patent
Venkatasubramanian et al.

(10) Patent No.: US 9,223,553 B2
(45) Date of Patent: Dec. 29, 2015

(54) METHODS AND APPARATUS TO VALIDATE TRANSLATED GUEST CODE IN A DYNAMIC BINARY TRANSLATOR

(71) Applicant: INTEL CORPORATION, Santa Clara, CA (US)

(72) Inventors: Girish Venkatasubramanian, Sunnyvale, CA (US); Chaitanya Mangla, San Francisco, CA (US); Gerolf F. Hoflehner, San Jose, CA (US); Ethan Schuchman, San Jose, CA (US)

(73) Assignee: INTEL CORPORATION, Santa Clara, CA (US)

( * ) Notice: Subject to any disclaimer, the term of this patent is extended or adjusted under 35 U.S.C. 154(b) by 9 days.

(21) Appl. No.: 14/125,263

(22) PCT Filed: Sep. 26, 2013

(86) PCT No.: PCT/US2013/061967
§ 371 (c)(1),
(2) Date: Dec. 10, 2013

(87) PCT Pub. No.: WO2015/047278
PCT Pub. Date: Apr. 2, 2015

(65) Prior Publication Data
US 2015/0178104 A1 Jun. 25, 2015

(51) Int. Cl.
*G06F 9/45* (2006.01)
*F01D 5/08* (2006.01)
(Continued)

(52) U.S. Cl.
CPC *G06F 8/52* (2013.01); *F01D 5/082* (2013.01); *F02C 7/18* (2013.01); *G06F 8/51* (2013.01);
(Continued)

(58) Field of Classification Search
CPC .................................................. G06F 8/40–8/54
USPC ................................................... 717/136–137
See application file for complete search history.

(56) References Cited

U.S. PATENT DOCUMENTS 6,631,514 B1  10/2003  Le
6,704,925 B1 *  3/2004  Bugnion .................. 717/138
(Continued)

OTHER PUBLICATIONS

Dynamic Binary Translation and Optimization—Kemal Ebcioglu, Senior Member, IEEE, Erik Altman, Member, IEEE Computer Society, Michael Gschwind, Senior Member, IEEE, and Sumedh Sathaye, Member, IEEE—IEEE Transactions on Computers, vol. 50, No. 6, Jun. 2001.*
(Continued)

*Primary Examiner* — Jason Mitchell
*Assistant Examiner* — Francisco Aponte
(74) *Attorney, Agent, or Firm* — Hanley, Flight & Zimmerman, LLC

(57) ABSTRACT

Methods, apparatus, systems and articles of manufacture are disclosed to validate translated guest code in a dynamic binary translator. An example apparatus disclosed herein includes a translator to generate a first translation of code to execute on a host machine, the first translation of the guest code to facilitate creating a first translated guest code, and the translator to generate a second translation of the translated guest code to execute on the host machine. The example apparatus also includes a translation versions manager to identify a first host machine state based on executing a portion of the first translation, and the translation versions manager to identify a second host machine state based on executing a portion of the second translation. The example system also includes a validator to determine a state divergence status of the second translation based on a comparison between the first host machine state and the second host machine state.

17 Claims, 7 Drawing Sheets

(51) Int. Cl.
  *F02C 7/18* (2006.01)
  *G06F 9/445* (2006.01)

(52) U.S. Cl.
  CPC ........ *G06F 9/44589* (2013.01); *F05D 2250/38* (2013.01); *F05D 2260/14* (2013.01); *F05D 2260/941* (2013.01); *Y10T 29/49* (2015.01); *Y10T 29/49995* (2015.01)

(56) References Cited

U.S. PATENT DOCUMENTS

| | | | |
|---|---|---|---|
| 6,751,583 B1 | 6/2004 | Clarke et al. | |
| 7,107,580 B2 | 9/2006 | Zemach et al. | |
| 7,752,613 B2* | 7/2010 | Guo et al. | 717/153 |
| 8,141,066 B2* | 3/2012 | Chatterjee et al. | 717/158 |
| 8,209,524 B2* | 6/2012 | Ferren et al. | 712/226 |
| 8,230,402 B2* | 7/2012 | Chen et al. | 717/136 |
| 8,255,882 B2 | 8/2012 | Zhang et al. | |
| 8,336,036 B2 | 12/2012 | Kim et al. | |
| 8,621,468 B2* | 12/2013 | Bendapudi et al. | 718/102 |
| 8,789,023 B2* | 7/2014 | Lindahl et al. | 717/129 |
| 2004/0133884 A1* | 7/2004 | Zemach et al. | 717/138 |
| 2005/0149915 A1* | 7/2005 | Wu et al. | 717/137 |
| 2005/0235269 A1* | 10/2005 | K N et al. | 717/136 |
| 2005/0235270 A1* | 10/2005 | Sanyal | 717/136 |
| 2006/0005003 A1* | 1/2006 | Grobman | 713/2 |
| 2006/0114132 A1* | 6/2006 | Zhang et al. | 341/50 |
| 2007/0261038 A1 | 11/2007 | Suba et al. | |
| 2008/0082971 A1* | 4/2008 | Walker et al. | 717/151 |
| 2008/0172661 A1* | 7/2008 | Chatterjee et al. | 717/158 |
| 2008/0244538 A1* | 10/2008 | Nair et al. | 717/137 |
| 2009/0300250 A1 | 12/2009 | Weissman | |
| 2009/0307430 A1* | 12/2009 | Bruening et al. | 711/119 |
| 2010/0088474 A1 | 4/2010 | Agesen | |
| 2010/0274551 A1* | 10/2010 | Das et al. | 703/26 |
| 2012/0284011 A1 | 11/2012 | Miura | |
| 2013/0283249 A1* | 10/2013 | Kanhere et al. | 717/139 |
| 2013/0305019 A1* | 11/2013 | Caprioli et al. | 712/205 |
| 2014/0281352 A1* | 9/2014 | Venkatsubramanian et al. | 711/205 |

OTHER PUBLICATIONS

Thread-Safe Dynamic Binary Translation using Transactional Memory—JaeWoong Chung, Michael Dalton, Hari Kannan, Christos Kozyrakis—Computer Systems Laboratory—Stanford University—2008 IEEE.*
International Searching Authority, "International Search Report and Written Opinion," issued in connection with corresponding International Patent Application No. PCT/US2013/061967, mailed Jun. 2, 2014 (12 pages).
Wikipedia, "Binary Translation," [retrieved on May 13, 2013]. Retrieved from the Internet < URL: https://en.wikipedia.org/wiki/Binary_translation> (3 pages).
Wikipedia, "Instruction Set Simulator," [retrieved on May 13, 2013]. Retrieved from the Internet < URL: https://en.wikipedia.org/wiki/Instruction_set_simulator> (4 pages).
Wikipedia, "Shadow Memory," [retrieved on May 13, 2013]. Retrieved from the Internet < URL: https://en.wikipedia.org/wiki/Shadow_memory> (1 page).

* cited by examiner

METHODS AND APPARATUS TO VALIDATE TRANSLATED GUEST CODE IN A DYNAMIC BINARY TRANSLATOR

FIELD OF THE DISCLOSURE

This disclosure relates generally to binary translation, and, more particularly, to methods and apparatus to validate translated guest code in a dynamic binary translator.

BACKGROUND

A binary translator analyzes blocks of guest code, generates functionally equivalent code blocks (sometimes referred to herein as "code translations," which result in translated code blocks) for a host machine instruction set architecture, performs optimizations on the code translations and schedules the translated code blocks for execution on the host machine. When successful, the results of executing the code translations on the host machine are the same as the results when executing the guest code on a guest instruction set architecture machine.

DETAILED DESCRIPTION

Figure 1:
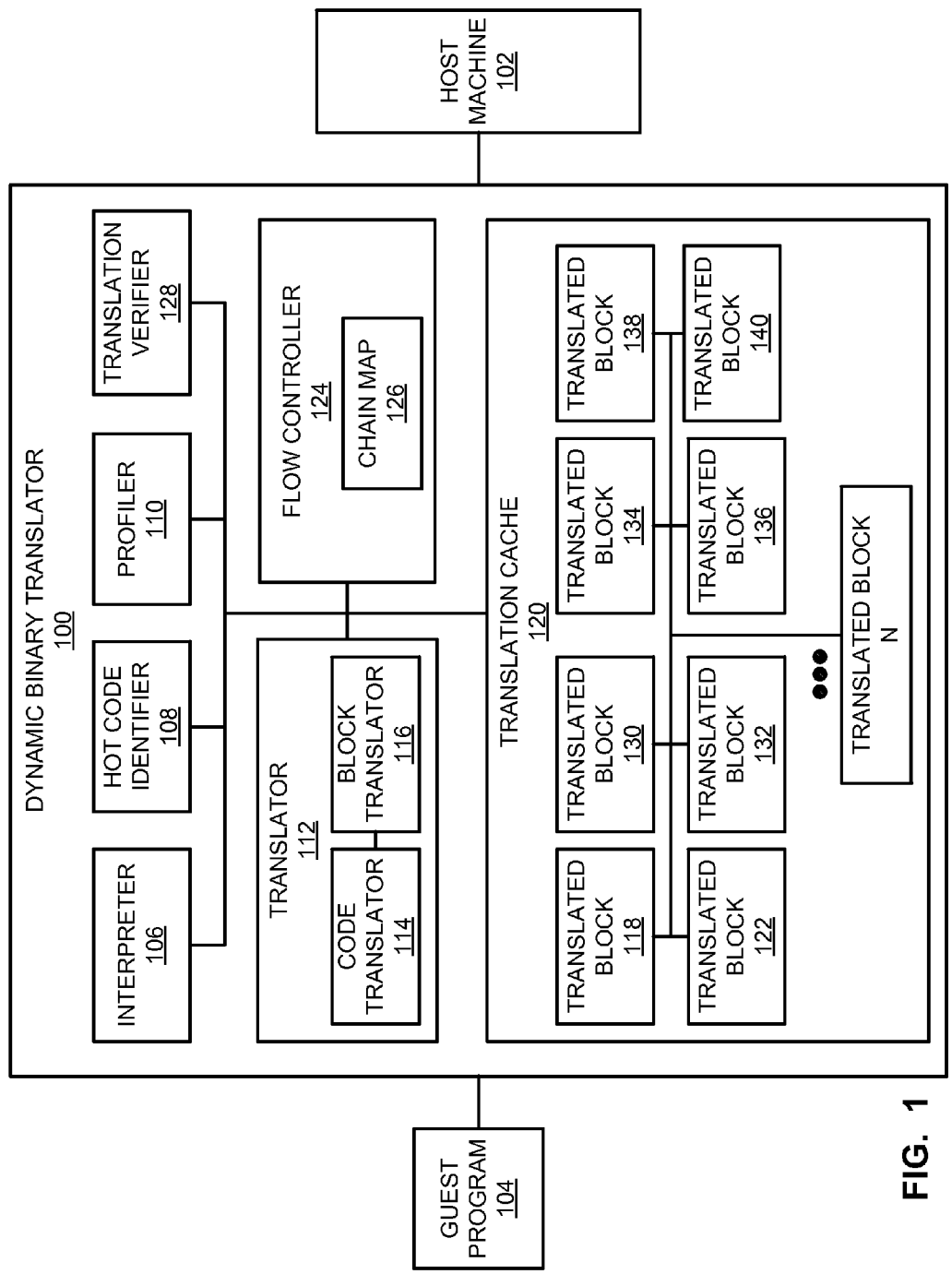
FIG. 1 is a schematic illustration of an example system that includes an example dynamic binary translator in accordance with the teachings of this disclosure.

Binary translation is a virtualization technique that enables a virtual machine running on a host system to efficiently execute guest code of an instruction set architecture that is foreign to the host. Binary translation enables the virtual machine to execute guest binary instructions in a manner that complies with a guest instruction set architecture (ISA), in which the guest binary instructions, when translated properly, execute on a host machine instruction set architecture in a manner consistent with native host binary instructions. In some instances, a binary translator may interpret guest binary instructions, in which a guest binary instruction is read, decoded (e.g., the guest binary instructions are converted into host binary instructions) and then executed, one guest binary instruction at a time. In contrast, in some examples, the binary translator may identify a block of guest binary instructions (e.g., one or more guest binary instructions), decode the block of guest binary instructions, optimize the decoded block, and then store (e.g., cache) the translated block for re-use at a later time (sometimes referred to as "dynamic compilation," "just-in-time (JIT) compilation" or "dynamic binary translation"). Optimizing the decoded block may include modifying the translated guest binary instructions based on, for example, user configuration (e.g., user selected features, etc.), host machine runtime environment (e.g., operating system version, installed (and available) hardware and/or drivers, etc.), re-ordering an execution sequence of the guest binary instructions of the decoded block (e.g., based on profile information of the guest binary instructions), identifying host binary instructions that execute more efficiently than the guest binary instructions (e.g., identifying a host binary instruction that loads more than one value rather than loading one value at a time), etc. Guest binary instructions (sometimes referred to herein as "guest binary," "guest code" or "source code") may be translated to (e.g., converted to) host binary instructions (sometimes referred to herein as "host binary," "host code" or "target code") to achieve portability, improve performance and/or lower power consumption.

Binary translation is generally performed by either static binary translators or dynamic binary translators. Static binary translators perform guest code translation before the guest code is executed (e.g., offline). In contrast, dynamic binary translators perform the guest code translation during execution of the guest code (e.g., at runtime).

In general, the results of executing the translated code is the same as executing the guest code. In some examples, the binary translator may emulate the behavior of the hardware and/or software components of the guest system with the hardware and/or software components of the host machine. In some such examples, when the guest program (e.g., a guest program or a guest operating system having guest code/instructions) requests hardware or software resources, the binary translator provides functionally equivalent resources for the guest program that are compliant with the host machine. That is, when the guest program requests hardware or software resources as it would on an actual (e.g., "real") guest ISA machine, the binary translator (or guest hardware support emulator) uses equivalent resources of the host machine to complete the request, all while the guest program continues executing as if the resources returned were the resources requested. Thus, in some examples, a guest program may be unaware that it is being executed on a different system (e.g., a host machine). In some such examples, the binary translator may initiate self-verification to determine the correctness of the translation. For example, the binary translator may execute the guest program (or guest code of the guest program), execute the translated guest program (or host code of the translated guest program), and compare the results. To determine the correctness of the new translation, the binary translator may compare system states of the host machine after executing the respective programs. Depending on whether a state divergence is detected (e.g., determining whether the post-execution states are the same), the translated guest code may be validated and stored in a cache or may be discarded. In some examples, instead of being discarded, the translated guest code may be retained and accessed at a later time.

Generally, when a host machine begins emulating a guest program, the dynamic binary translator interprets the guest program. That is, the dynamic binary translator fetches one guest instruction at a time from the guest program, decodes the guest instruction into a host machine compliant instruction, and then executes the decoded guest instruction. Depending on the guest program being emulated, this process may be a resource intensive process. Thus, some dynamic binary translators may monitor the guest instruction(s) executed and identify a frequently executed guest instruction. When a frequently executed guest instruction (or "hot instruction" or "hot code") is identified, the dynamic binary translator may translate a block of guest instructions that include one or more hot guest instructions. A block of instructions (or "basic block") is one or more instructions that are executed in sequence. Block boundaries may be identified based on instructions that either accept control from another point (e.g., an entry instruction such as the destination of a branch instruction) or transfer control to another point (e.g., an exit instruction such as a branch instruction). Thus, when the first instruction in a block is executed, the remaining instructions in the block are sequentially executed. The dynamic binary translator then stores the translated block (e.g., a translated block of instructions defined by an entry instruction and an exit instruction, and that includes one or more hot guest instructions) in a translation cache. As a result, when the dynamic binary translator fetches a guest instruction to execute that corresponds to an entry instruction stored in the translation cache, the dynamic binary translator executes the entry instruction and any additional translated guest instructions included in a corresponding translated block rather than interpreting (e.g., decoding and executing) the guest instruction. As the translated blocks are typically optimized, executing a block of translated guest instructions is more efficient (e.g., faster, more power efficient, more space (memory) efficient, etc.) relative to interpreting and executing a sequence of guest instructions.

When a translation is initially created (e.g., generated), the translated block is typically a "light weight" translation with minimal performance optimization. Rather, the emphasis with the first translation is typically on the speed of creating the translation. As the frequency of execution of the translated block increases, time may be invested in optimizing the translation (e.g., advancing to one or more higher degrees of optimization), which results in improved translated code performance.

In some examples, a translated block may be translated more than one time. For example, a translated block from the translation cache may be executed more frequently than other translated blocks. In some such examples, the dynamic binary translator may further optimize the more frequently executed translated block (e.g., a "hot block") and store this new and more optimized translation in the translation cache.

While the examples disclosed herein discuss translating guest instructions into host instructions, the guest instructions and the host instructions may be compliant with an identical ISA or correspond to different ISAs. For example, the focus of translation operations between identical guest and host ISAs may be directed to improving performance and/or power consumption. In contrast, translation operations from a guest ISA to a different host ISA may be implemented for portability across ISAs. Any number of subsequent translations may be applied to one or more instructions in an effort to improve one or more aspects of the instruction(s) during execution. As described above, translation operations may occur in an effort to improve execution speed, execution efficiency and/or execution power consumption.

To ensure the translated host program is functionally the same as the guest program, when a block of guest instructions is translated (e.g., a translated block is created, generated, etc.), the correctness of the translated block may be validated or verified. In some known systems, the outcome of executing the translated block may be compared with the outcome of interpreting (e.g., fetching, decoding and executing) the corresponding guest instructions. If the outcomes are the same (e.g., register states of the computing device are the same after executing both the translated block and the corresponding guest instructions), the newly translated block is considered validated, the dynamic binary translator updates the host program execution sequence (or execution chain) to include the newly translated block, and any older translation versions (e.g., translations having different degrees of optimization) are discarded.

Unlike prior systems, examples disclosed herein retain the older translation versions (e.g., the previously validated translations) for further usage. As a translation is discarded if not validated (e.g., includes a state divergence), the older translation versions are necessarily validated translations. Thus, when determining the validity of a new translation, examples disclosed herein may compare execution state (e.g., state information including register values, etc.) of the new translation to execution state of a validated translation. As a result, this process of comparing the results of executing the two different translation versions rather than comparing the results of executing a translation and interpreting corresponding guest instructions (sometimes referred to herein as "self-verification") improves validation speeds of the new translation. Furthermore, comparing two different translation versions (e.g., two different degrees of optimization translations), where one of the translations is a validated translation, may improve identifying the cause of a state divergence between the two translation versions. That is, by retaining, rather than discarding, the older translation version(s) (e.g., the validated translation(s)), examples disclosed herein facilitate fine-grain differential testing of an unvalidated translation.

FIG. 1 is a block diagram of an example dynamic binary translator 100 to facilitate fine-grain differential testing of translations. The example dynamic binary translator 100 of FIG. 1 enables a host machine 102 to execute guest code (or guest instructions) of a guest program 104. In some examples, the dynamic binary translator 100 interprets one guest instruction of the guest program 104 at a time. In some other examples when the guest instruction was previously translated by the dynamic binary translator 100 (e.g., analyzed, optimized and cached), the dynamic binary translator 100 executes a translated block that includes the translated guest instruction (e.g., host ISA compliant instruction) and that is semantically equivalent to a block of guest instructions of the guest program 104 on the host machine 102. The dynamic binary translator 100 includes an example interpreter 106, an example hot code identifier 108, an example profiler 110, an example translator 112, an example code translator 114, an example block translator 116, an example translation cache 120, an example flow controller 124, an example chain map 126 and an example translation verifier 128. In some examples, one or more components of the dynamic binary translator 100 may be collectively referred to as a runtime manager. For example, the runtime manager may include the hot code identifier 108, the profiler 110, the flow controller 124 and/or the translation verifier 128.

In the illustrated example of FIG. 1, the dynamic binary translator 100 includes the interpreter 106 to execute guest instructions from the guest program 104. The interpreter 106 fetches a guest instruction one-at-a-time, decodes it, and then emulates execution of the guest instruction on the host machine 102. After interpreting the guest instruction, the interpreter 106 fetches the next guest instruction for execution from the guest program 104.

The example hot code identifier 108 and the example profiler 110 monitor execution of the guest program 104. The example hot code identifier 108 identifies frequently executed guest instructions and/or translations (e.g., translated blocks). For example, the hot code identifier 108 may include one or more counters that correspond to a guest instruction and that increment each time the corresponding guest instruction is executed. When the counter reaches a hot code threshold, the example hot code identifier 108 may identify and/or otherwise label the guest instruction as hot code. In general, the example hot code identifier 108 may identify guest code 104 as hot code or a translated block as hot code. The example profiler 110 may monitor execution of the guest instructions to generate profiling data. For example, the profiler 110 may determine branch-direction statistics for the guest instructions. In some examples, the profiler 110 may output the profiling data to the translator 112 to use during optimizing.

In the illustrated example of FIG. 1, the code translator 114 of the translator 112 identifies a block of guest instructions that includes the hot code identified by the hot code identifier 108. For example, the code translator 114 may scan a sequence of guest instructions and mark block boundaries of a basic block. In the illustrated example of FIG. 1, the code translator 114 inserts a commit instruction at the end of an identified block. As described below in connection with the example translation verifier 128, the commit instruction may be used by the translation verifier 128 in verifying two different translated blocks are semantically equivalent (e.g., validating a translation). The example code translator 114 then decodes the block of guest instructions into a host machine compliant block of instructions and optimizes the translated block of guest instructions for execution on the host machine 102. For example, the code translator 114 may identify a block of guest code, decode the guest code into a host machine compliant block of translated guest instructions, and then reorder the execution sequence of the translated guest instructions on the host machine 102. In some examples, the code translator 112 may retrieve profiling data from the profiler 110 and sequence the translated block based on the profiling data. The example code translator 114 of FIG. 1 stores an example translated block 118 in the translation cache 120.

In the illustrated example of FIG. 1, the block translator 116 of the translator 112 optimizes a hot block identified by the example hot code identifier 108. For example, the hot code identifier 108 may determine that during execution of the guest program 103, the translated block 118 in the translation cache 120 is frequently executed. Thus, in some such examples, the block translator 116 may further optimize the translated guest instructions in the translated block 118. In some examples, the block translator 116 may retrieve profiling data from the example profiler 110 and optimize the translated block 118 based on the profiling data. In some other examples, the profiling data may identify a series of translated blocks, including the translated block 118, that are typically executed in sequence. In some such examples, the block translator 116 may generate a new translated block that includes the sequence of translated blocks and then optimize the sequence of translated blocks. In the illustrated example of FIG. 1, the block translator 116 stores example translated block 122 (e.g., the higher degree of optimization translation) in the translation cache 120. Thus, the translated block 118 may sometimes be referred to as the lower degree of optimization translation 118 and the translated block 122 may sometimes be referred to as the higher degree of optimization translation.

During code translation, the example flow controller 124 of the dynamic binary translator 100 controls the flow of execution of guest program 104. In the illustrated example of FIG. 1, the flow controller 124 maintains an example chain map 126 (e.g., a lookup table) of the translations stored in the translation cache 120 and a sequence with which to execute the translations (e.g., an execution chain) on the basis of observed control flow. In addition, the example flow controller 124 manages switching execution of the guest program between the interpreter 106 and translations from the translation cache 120. For example, the flow controller 124 may instruct the interpreter 106 to fetch one guest instruction of the guest program 104 at a time and execute the guest instruction. When a guest instruction corresponds to an entry instruction of a translated block stored in the translation cache 120, the example flow controller 124 retrieves the corresponding translated block from the translation cache 120 to send to the host machine 102 to execute. In other words, rather than allow the relatively slower process of interpreting one or more guest instructions with the example interpreter 106, the example flow controller 124 identifies corresponding translation(s) stored in the example translation cache 120 for the example host machine 102 to execute.

In the illustrated example of FIG. 1, when the flow controller 124 identifies two translation versions (e.g., different degrees of optimization translations) corresponding to the same guest code, the flow controller 124 initiates the example translation verifier 128 to validate the newer (e.g., unvalidated) translation. In the illustrated example, the translation verifier 128 retrieves the two translation versions from the translation cache 120 and initiates self-verification to determine the validity of the new translation. For example, the translation verifier 128 may retrieve the translated block 130 (e.g., a validated translation) and example translated block 132 (e.g., an unvalidated translation), execute the two translation versions and, based on a comparison of the post-execution states, determines whether the two translation versions are semantically equivalent. If a state divergence in the results is detected, the state divergence is attributed to the unvalidated translation (e.g., the translated block 132). In some examples, when a state divergence is detected, the unvalidated translation is discarded. In some such examples, the flow controller 124 may unlink the unvalidated translation from the execution chain and connect the validated translation (e.g., the translated block 130). In some examples, when a state divergence is detected, a log entry may be recorded.

In contrast, when the translation verifier 128 does not detect a state divergence, the unvalidated translation is validated. For example, the translation verifier 128 may update a validated status (e.g., an indicator such as a flag or status bit) for the translated block to indicate the translated block is validated. In some examples, when the unvalidated translation is validated, the older, previously validated translation is discarded.

In some examples, a certification setting may be enabled. As used herein, "certification" of a translation includes validating the translation a threshold number of times. In some such examples, the translation verifier 128 may validate a validated but uncertified translation (e.g., an example translated block 134 stored in the translation cache 120) a threshold number of times prior to certifying the translation. Thus, rather than discarding the older, previously validated translation after the unvalidated translation is validated, the two translation versions are retained (e.g., stored in the translation cache 120) until either a certification threshold for certification is met and the validated but uncertified translation is certified (e.g., marked and stored in the translation cache 120 as an example translated block 136), or the validated but uncertified translation fails validation and the translation is discarded.

In some examples, a chain optimization setting may be enabled. In some such examples, the translation verifier 128 may execute two validated translations, where one translation version is a lower degree of optimization translation (e.g., an example translated block 138) and the other translation versions is a higher degree of optimization translation (e.g., an example translated block 140) a threshold number of times. After each iteration (e.g., execution), certain performance counters may be updated. For example, execution time of the respective translation version may be stored. When the two validated translation versions 138, 140 are executed the threshold number of times, the example translation verifier 128 may compare the respective performance counters to identify a more performance optimized translation. In some such examples, the more optimized translation may be retained, while the lesser optimized translation may be discarded. Thus, in some instances, even though the higher degree of optimization translation may be considered more optimized than the lower degree of optimization translation, the lower degree of optimization translation performance counters may indicate that executing the guest program 104 with the lower degree of optimization translation may be more optimal than with the higher degree of optimization translation and, thus, the higher degree of optimization translation may be discarded.

In addition, in some examples, when a state divergence is detected, the example translation verifier 128 may identify a hard or transient hardware fault. For example, by self-verifying a translation against a validated translation (or interpreted guest instruction), a detected state divergence may indicate the state divergence is due to a failing hardware unit of the host machine 102. In some such examples, the translation verifier 128 may instruct the translator 112 to avoid using the failing hardware unit in further translations.

While an example manner of implementing the dynamic binary translator 100 of FIG. 1 is illustrated in FIG. 1, one or more of the elements, processes and/or devices illustrated in FIG. 1 may be combined, divided, re-arranged, omitted, eliminated and/or implemented in any other way. Further, the example interpreter 106, the example hot code identifier 108, the example profiler 110, the example translator 112, the example code translator 114, the example block translator 116, the example translation cache 120, the example flow controller 124, the example chain map 126, the example translation verifier 128 and/or, more generally, the example dynamic binary translator 100 of FIG. 1 may be implemented by hardware, software, firmware and/or any combination of hardware, software and/or firmware. Thus, for example, any of the example interpreter 106, the example hot code identifier 108, the example profiler 110, the example translator 112, the example code translator 114, the example block translator 116, the example translation cache 120, the example flow controller 124, the example chain map 126, the example translation verifier 128 and/or, more generally, the example dynamic binary translator 100 of FIG. 1. could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the interpreter 106, the example hot code identifier 108, the example profiler 110, the example translator 112, the example code translator 114, the example block translator 116, the example translation cache 120, the example flow controller 124, the example chain map 126 and/or the example translation verifier 128 is/are hereby expressly defined to include a tangible computer readable storage device or storage disk such as a memory, a digital versatile disk (DVD), a compact disk (CD), a Blu-ray disk, etc. storing the software and/or firmware. Further still, the example dynamic binary translator 100 of FIG. 1 may include one or more elements, processes and/or devices in addition to, or instead of, those illustrated in FIG. 1, and/or may include more than one of any or all of the illustrated elements, processes and devices.

Figure 2:
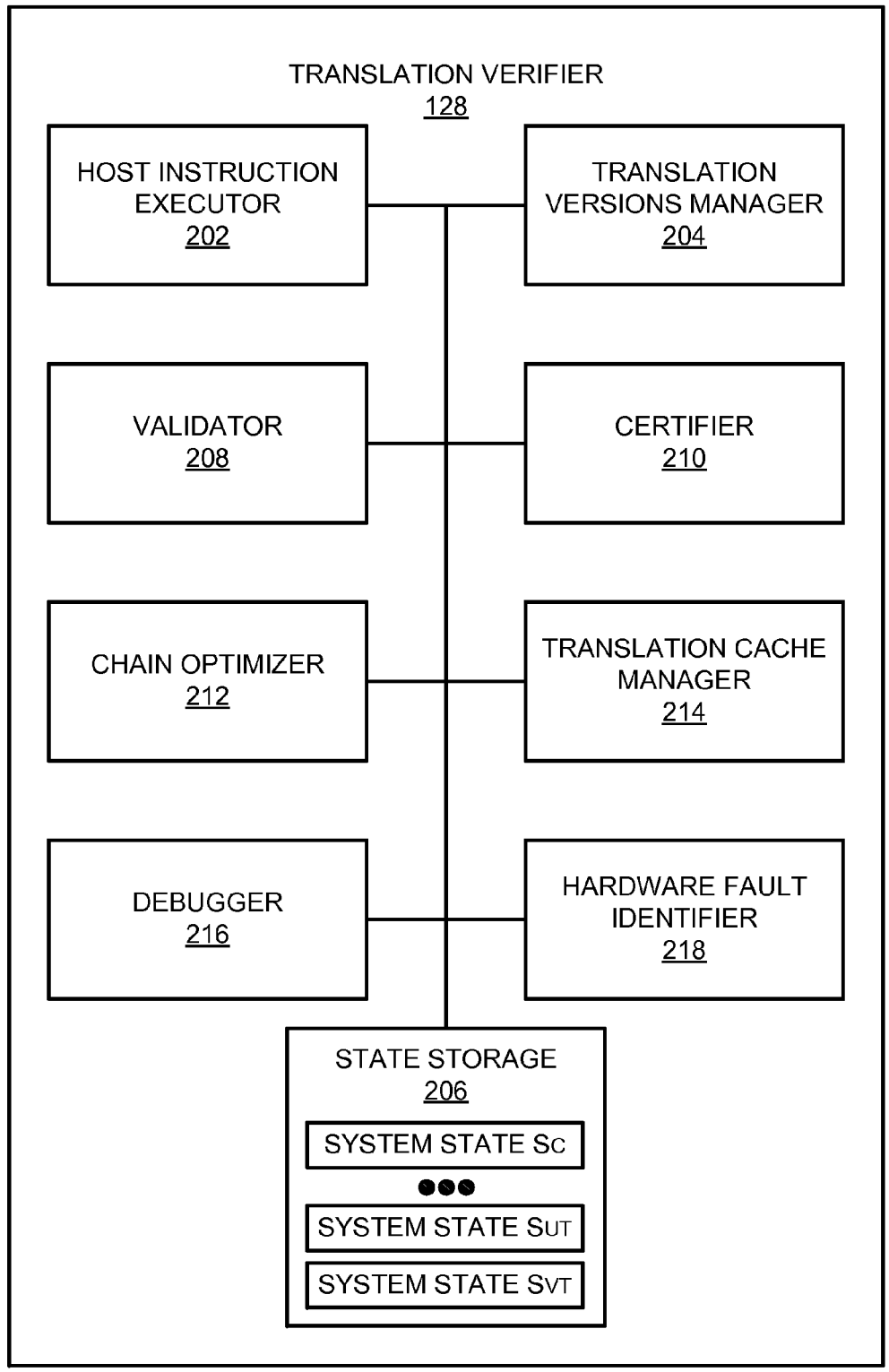
FIG. 2 is a block diagram of an example translation verifier of the example dynamic binary translator of FIG. 1.

FIG. 2 is a block diagram of the example translation verifier 128 of FIG. 1. In the illustrated example of FIG. 2, the translation verifier 128 validates translated blocks of code (e.g., translations) generated by the dynamic binary translator 100 of FIG. 1. The example translation verifier 128 of FIG. 2 includes an example host instruction executor 202, an example translation versions manager 204, an example state storage 206, an example validator 208, an example certifier 210, an example chain optimizer 212, an example translation cache manager 214, an example debugger 216, and an example hardware fault identifier 218. In some examples, the translation cache manager 214 may be included with the translation cache 120 of FIG. 1.

In the illustrated example of FIG. 2, the host instruction executor 202 receives a host machine compliant instruction (e.g., a translated guest instruction) and executes the instruction on the host machine 102 (FIG. 1). For example, the host instruction executor 202 may identify which hardware and/or software resources of the host machine 102 are needed to execute the instruction and then instruct those respective resources to execute the instruction. The example host instruction executor 202 updates state information of hardware and/or software components of the host machine 102 after executing the translated guest instruction. State information may include register values, memory addresses, memory address values, performance counters, etc.

In the illustrated example of FIG. 2, the translation versions manager 204 maintains a record of the translation versions (e.g., different translation versions) in, for example, a lookup table, manages execution of the translation versions and preserves the correct state of the host machine 102 during validation. For example, in response to an indication to execute a translated block(s) (e.g., from the example flow controller 124 of FIG. 1), the translation versions manager 204 may retrieve one or more translated blocks 118, 122, 130, 132, 134 136, 138, 140 from the translation cache 120 of FIG. 1. In some examples, the translation versions manager 204 sends translated guest instructions from the translation to the host instruction executor 202 to execute. In the illustrated example of FIG. 2, the translation versions manager 204 stops instructing the host instruction executor 202 to execute the translation instructions when a commit instruction is reached. As described above, the example translator 112 (FIG. 1) inserts a commit instruction at the end of (e.g., as the last instruction of or before an exit instruction of) a translated block. Thus, when the example translation versions manager 204 reaches the commit instruction, the translation versions manager 204 prevents the flow controller 124 from progressing to the next block or guest instruction in the execution chain by delaying execution of the commit instruction.

In addition, the translation versions manager 204 maintains the correct state of the host machine 102 during validation. For example, the translation versions manager 204 may store current state information $S_C$ of the system (e.g., the example host machine 102) in the state storage 206 prior to executing a translation. In addition, the translation versions manager 204 may use the current system state $S_C$ from the state storage 206 to roll back the state of the host machine 102. For example, the translation versions manager 204 may store the current system state $S_C$ prior to executing the unvalidated translation 132 and then use the current system state $S_C$ to roll back the state of the host machine 102 prior to executing the translated block 130 (e.g., the validated translation). In this manner, the translation versions manager 204 maintains the state of the host machine 102 so that both translation versions are executed from the same state. In addition, the example translation versions manager 204 may store the system state of the host machine 102 after translation execution. For example, when the translation versions manager 204 reaches the commit instruction during execution of the unvalidated translation, the translation versions manager 204 may store example system state information $S_{UT}$ in the state storage 206, and store example system state information $S_{VT}$ during execution of the validated translation.

In the illustrated example of FIG. 2, the validator 208 compares the results of executing the unvalidated translation 132 and the validated translation 130 and determines whether the two translation versions are semantically equivalent. For example, the validator 210 may retrieve the post-unvalidated translation execution system state $S_{UT}$ and the post-validated translation execution system state $S_{VT}$ from the state storage 206 and compare the two states. Based on the results of the comparison, in some examples, the unvalidated translation 132 may be validated. For example, if the state of the host machine 102 after executing the unvalidated translation 132 is the same as the state of the host machine 102 after executing the validated translation 130, the unvalidated translation 132 is considered semantically equivalent to the validated translation 130 and, thereby, validated. Otherwise, a state divergence (e.g., a bug) is detected in the unvalidated translation 132. The example validator 208 outputs the comparison results to the translation cache manager 214 and instructs the host instruction executor 202 to execute the commit instruction.

In the illustrated example of FIG. 2, the translation verifier 128 includes the certifier 210 to certify a validated translation. In some other examples, a translation is certified after it is validated a threshold number of times. For example, the certifier 210 may increment a counter each time a translation is validated by the validator 208. When the certification counter meets a certification threshold (e.g., fifty validations), then the certifier 210 certifies the translation. By waiting to certify a translation, the translation is exposed to more input combinations and, thus, more thoroughly tested for semantic equivalence to the corresponding guest code of the guest program 104. In some examples, the certifier 210 communicates a message to the translation cache manager 214 based on the certification status of the translated block. In some examples, the certifier 210 may be disabled. For example, a user may select not to certify a translation (e.g., may disable a certification setting).

In some examples, a translation (or translated block) may be optimized for a specific optimization. For example, translated guest instructions in a translation may be reordered to improve flow control of branch instructions in the translation. However, in some instances, the optimization may not result in improved performance of the execution chain. Thus, in the illustrated example of FIG. 2, the translation verifier 128 includes the chain optimizer 212 to test different degrees of optimization translations for improved performance. For example, the chain optimizer 212 may update the chain map 126 of FIG. 1 to execute (e.g., via the translation versions manager 204 instructing the host instruction executor 202) a higher degree of optimization translation (e.g., the translated block 140) a threshold number of times, and after the last execution, the chain optimizer 212 may store performance counters associated with executing the translated block 140 the threshold number of times in the state storage 206. For example, the chain optimizer 212 may update performance counters of the host machine 102 based on state information retrieved from the host instruction executor 202 after executing the translation version the threshold number of times. The example chain optimizer 212 may then update the chain map 126 to execute (e.g., via the translation versions manager 204 instruction the host instruction executor 202) a lower degree of optimization translation (e.g., the translated block 138) the threshold number of times, and after the last execution of the translated block 138, the example chain optimizer 212 may compare the performance counters after executing the translation versions 138, 140. Such a comparison may illustrate and/or otherwise determine whether the lower degree of optimization translation 138 performed better than the higher degree of optimization translation 140. Depending on which translation version performed better, one of the translations may be discarded or replaced.

In the illustrated example of FIG. 2, the translation cache manager 214 updates the translation cache 120 based on the information received from the validator 208, the certifier 210 and/or the chain optimizer 212. For example, if the validator 208 indicates a state divergence was detected while comparing the unvalidated translation 132 and the validated translation 130, then the translation cache manager 214 may discard the unvalidated translation 132. In contrast, if the validator 208 indicates that a state divergence was not detected, then the translation cache manager 214 may discard the validated translation 130. In some examples, if the certification setting and/or the chain optimization setting is enabled, the translation cache manager 214 may wait for additional information from the certifier 210 and/or the chain optimizer 212, respectively. In some examples, if the certifier 210 indicates the certification threshold is not met, then the translation cache manager 214 may retain both translation versions (e.g., the translated blocks 130, 134) in the translation cache 120. In contrast, if the certifier 210 indicates the certification threshold is met, then the translation cache manager 214 may discard the previously certified translation and retain the newly certified translation 136.

In the illustrated example of FIG. 2, if the chain optimizer 212 indicates to the translation cache manager 214 that the example validated and lower degree of optimization translation 138 performs better than the validated and higher degree of optimization translation 140, then the translation cache manager 214 may discard or otherwise replace the translated block 140 (e.g., the validated and higher degree of optimization translation) and retain the translated block 138 in the translation cache 120. In contrast, if the chain optimizer 212 indicates to the example translation cache manager 214 that the translated block 138 (e.g., the validated and lower degree of optimization translation) does not perform better than the translated block 140 (e.g., the validated and higher degree of optimization translation), then the translation cache manager 214 may discard or otherwise replace the translated block 138 (e.g., the validated and lower degree of optimization translation) and retain the translated block 140 in the translation cache 120. In some examples when the translated blocks 138, 140 perform the same, the translation cache manager 216 may randomly select one translation version to retain and discard the other translation, may alternate the translation version retained and discarded, and/or may default to retaining, for example, the higher degree of optimization translation.

In the illustrated example of FIG. 2, the translation verifier 128 includes the example debugger 216 to address state divergences identified by the validator 208. For example, when the validator 208 indicates the translated blocked 132 (e.g., the unvalidated translation) includes a bug (e.g., identified a state divergence), the debugger 216 instructs the flow controller 124 of FIG. 1 to pause executing the guest program 104. In some such examples, the debugger 216 may also indicate (e.g., via an audio alert such as a chime, beep, sound, etc. and/or a visual alert such as flashing a portion of a display associated with the host machine 102, highlighting a portion of the guest program 104, etc.) to a developer or programmer of the state divergence. The developer may then attempt to debug the translation.

In the illustrated example of FIG. 2, the translation verifier 128 includes the hardware fault identifier 218 to identify one or more hard or transient hardware faults associated with the host machine 102. As used herein, a hard hardware fault corresponds to a permanent hardware fault that may require physical intervention to fix. For example, a hard hardware fault may include a loose wire or connection in the host machine 102. In contrast, a transient hardware fault corresponds to temporary faults that may be attributed to, for example, the operating environment. For example, high operation temperatures of the host machine 102 may result in erratic behavior by components of the host machine 102. In some such examples, when the operation temperatures return to normal operating temperatures, the components of the host machine 102 may return to operating normally. In the illustrated example of FIG. 2, when the validator 208 detects a state divergence between the translated blocks 130, 132, the validator 208 initiates the hardware fault identifier 218 to determine whether the state divergence is due to one or more hardware faults (e.g., hard faults and/or transient faults) rather than one or more translation errors. For example, when a state divergence is detected, the hardware fault identifier 218 may step through (e.g., execute one instruction at a time) the unvalidated translation 132 to identify an erring instruction. In some such examples, the hardware fault identifier 218 may then identify which hardware units (e.g., resources) are utilized to execute the erring instruction. Once found, the example hardware fault identifier 218 may identify a subsequent translation instruction that utilizes the same resources and compare system state information after executing the subsequent translation instruction to determine if the state divergence is reproduced. In some examples, the hardware fault identifier 218 identifies one or more hardware units of the host machine 102 associated with execution of the erring instruction of the unvalidated translation 132 that prompted the state divergence. In some such examples, the hardware fault identifier 218 may instruct the translator 112 to avoid utilizing the identified hardware unit(s) in further translations.

In some examples, the hardware fault identifier 218 may instruct the host instruction executor 202 to execute the translated block 130 (e.g., the unvalidated translation) instructions using different hardware paths. In some such examples, the hardware fault identifier 218 may poll the state information of the host machine 102 after each execution, and then select the most common state as the state of executing the translated block 130.

While an example manner of implementing the translation verifier 128 of FIG. 1 is illustrated in FIG. 2, one or more of the elements, processes and/or devices illustrated in FIG. 2 may be combined, divided, re-arranged, omitted, eliminated and/or implemented in any other way. Further, the example host instruction executor 202, the example translation versions manager 204, the example state storage 206, the example validator 208, the example certifier 210, the example chain optimizer 212, the example translation cache manager 214, the example debugger 216, the example hardware fault identifier 218 and/or, more generally, the example translation verifier 128 of FIG. 1 may be implemented by hardware, software, firmware and/or any combination of hardware, software and/or firmware. Thus, for example, any of the example host instruction executor 202, the example translation versions manager 204, the example state storage 206, the example validator 208, the example certifier 210, the example chain optimizer 212, the example translation cache manager 214, the example debugger 216, the example hardware fault identifier 218 and/or, more generally, the example translation verifier 128 of FIG. 1 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example host instruction executor 202, the example translation versions manager 204, the example state information storage 206, the example validator 208, the example certifier 210, the example chain optimizer 212, the example translation cache manager 214 the example debugger 216 and/or the example hardware fault identifier 218 is/are hereby expressly defined to include a tangible computer readable storage device or storage disk such as a memory, a digital versatile disk (DVD), a compact disk (CD), a Blu-ray disk, etc. storing the software and/or firmware. Further still, the example translation verifier 218 of FIG. 1 may include one or more elements, processes and/or devices in addition to, or instead of, those illustrated in FIG. 2, and/or may include more than one of any or all of the illustrated elements, processes and devices.

Flowcharts representative of example machine readable instructions for implementing the example translation verifier 128 of FIG. 1 are shown in FIGS. 3-6. In these examples, the machine readable instructions comprise programs for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 3-6, many other methods of implementing the example translation verifier 128 may alternatively be used. For example, the order of execution of the blocks may be changed, and/or some of the blocks described may be changed, eliminated, or combined.

As mentioned above, the example processes of FIGS. 3-6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3-6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals and to exclude transmission media. As used herein, when the phrase "at least" is used as the transition term in a preamble of a claim, it is open-ended in the same manner as the term "comprising" is open ended.

Figure 3:
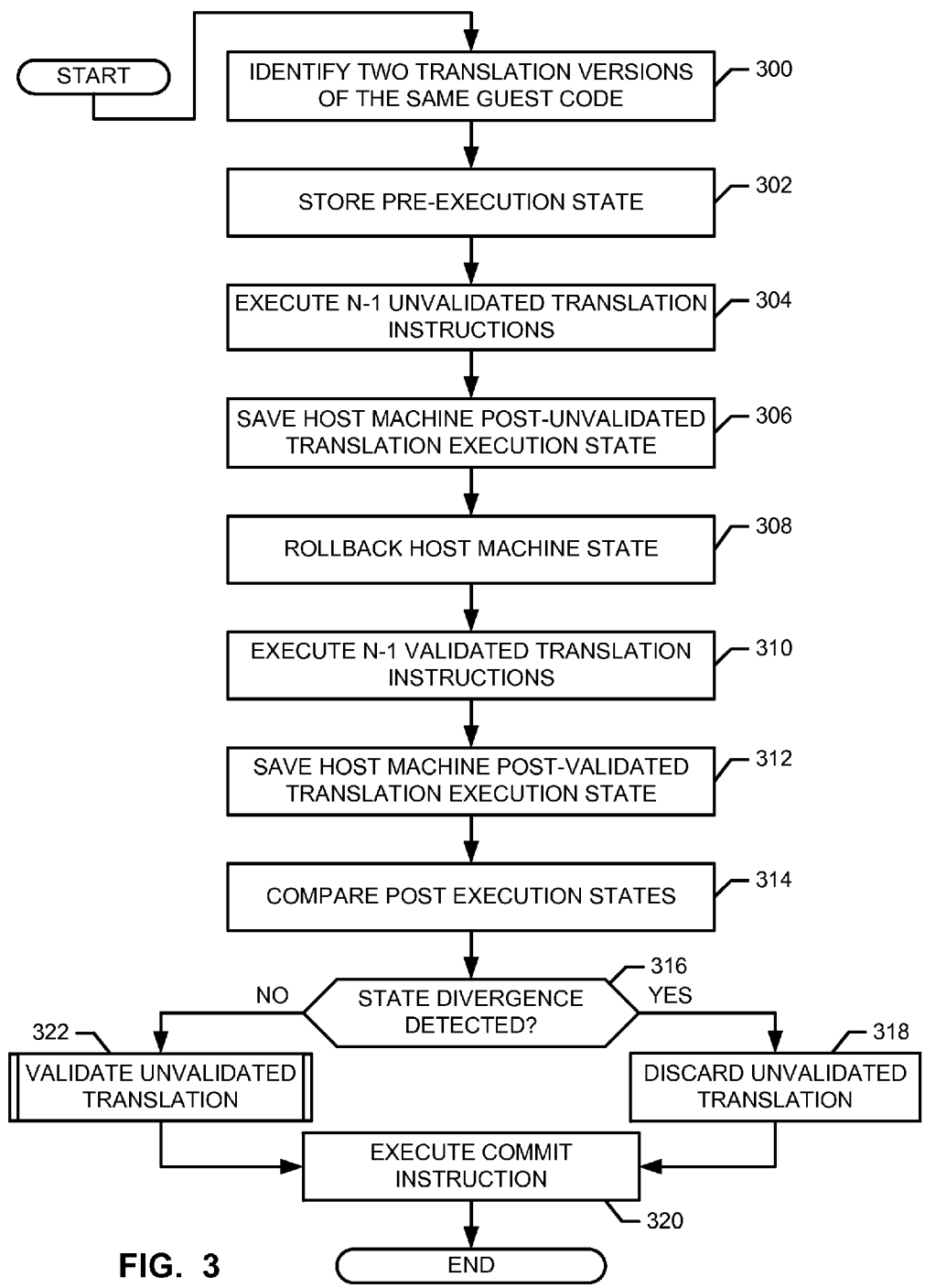
FIGS. 3-6 are flow charts representative of example machine readable instructions which may be executed to validate translated guest code in a dynamic binary translator.

The program of FIG. 3 begins at block 300, at which the translation verifier 128 of FIGS. 1 and/or 2 receives an indication that multiple translation versions (e.g., different degrees of optimization translations) of the same guest code are stored in the translation cache 120 of FIG. 1. For example, the flow controller 124 of FIG. 1 may send a message to the translation verifier 128 when the translator 112 of FIG. 1 translates a lower degree of optimization translation (e.g., the example validated translation 130) and stores the corresponding higher degree of optimization translation (e.g., the example unvalidated translation 132) in the translation cache 120 of FIG. 1. At block 302, the translation versions manager 204 stores the state of the host machine 102 prior to executing an unvalidated translation. For example, the unvalidated translation manager 204 may store current system state information $S_C$ of the host machine 102 in the state storage 206. At block 304, the translation versions manager 204 instructs the host instruction executor 202 to execute translated guest instructions from the unvalidated translation until a commit instruction is reached. For example, the unvalidated translation manager 204 may retrieve the translated block 132 from the translation cache 120 and send the translated guest instructions from the translated block 132 to the host instruction executor 202. As described in greater detail above, the example translator 112 of FIG. 1 inserts a commit instruction at the end of a translated block (e.g., prior to an exit instruction) and, thus, the commit instruction may be referred to as an Nth instruction. Thus, the translation versions manager 204 instructs the host instruction executor 202 to execute N–1 instructions. At block 306, the translation versions manager 204 stores (or saves) the system state $S_{UT}$ of the host machine 102 in the state storage 206 after executing the N–1 instructions.

At block 308, the translation versions manager 204 rolls the state of the host machine 102 back to a state prior to executing the validated translation. For example, the translation versions manager 204 may retrieve the system state information $S_C$ from the state storage 206 to update the state of the host machine 102. At block 310, the translation versions manager 204 instructs the host instruction executor 202 to execute the first N–1 instructions of the validated translation 130. That is, the host instruction executor 202 executes the translated guest instructions from the translated block 130 until a commit instruction (e.g., instruction N) is reached. At block 312, the translation versions manager 204 stores the system state $S_{VT}$ of the host machine 102 in the state storage 206 after executing the N–1 instructions. At block 314, the validator 208 compares the correctness of the translated block 132 (e.g., the unvalidated translation) to the translated block 130 (e.g., the validated translation). For example, the validator 208 may retrieve from the state storage 206 the system state information $S_{VT}$ and the system state information $S_{UT}$, and then compare the states. If, at block 316, a state divergence between the unvalidated translation and the validated translation states is detected, then, at block 318, the validator 208 sends a message to the translation cache manager 214 to discard the translated block 132 (e.g., the unvalidated translation). In some examples, the validator 208 may also send a message to the debugger 216 to indicate the state divergence (e.g., output an audio alert and/or a visual alert) to a user. At block 320, the validator 208 instructs the host instruction executor 202 to execute the commit instruction (e.g., the Nth instruction of the translated block 130). The example program of FIG. 3 then ends.

In contrast, if, at block 316, a state divergence between the translated version states is not detected, then, at block 322, the validator 208 validates the translated block 132 (e.g., the unvalidated translation) as described below in connection with FIG. 4. For example, the validator 208 may send a message to the translation cache manager 214 to discard the translated block 130. In some examples, the validator 208 may send an indication to the certifier 210 to determine if the translated block 132 is a certified translation. Control then proceeds to block 320 to execute the commit instruction (e.g., the Nth instruction of the translated block 130).

Figure 4:
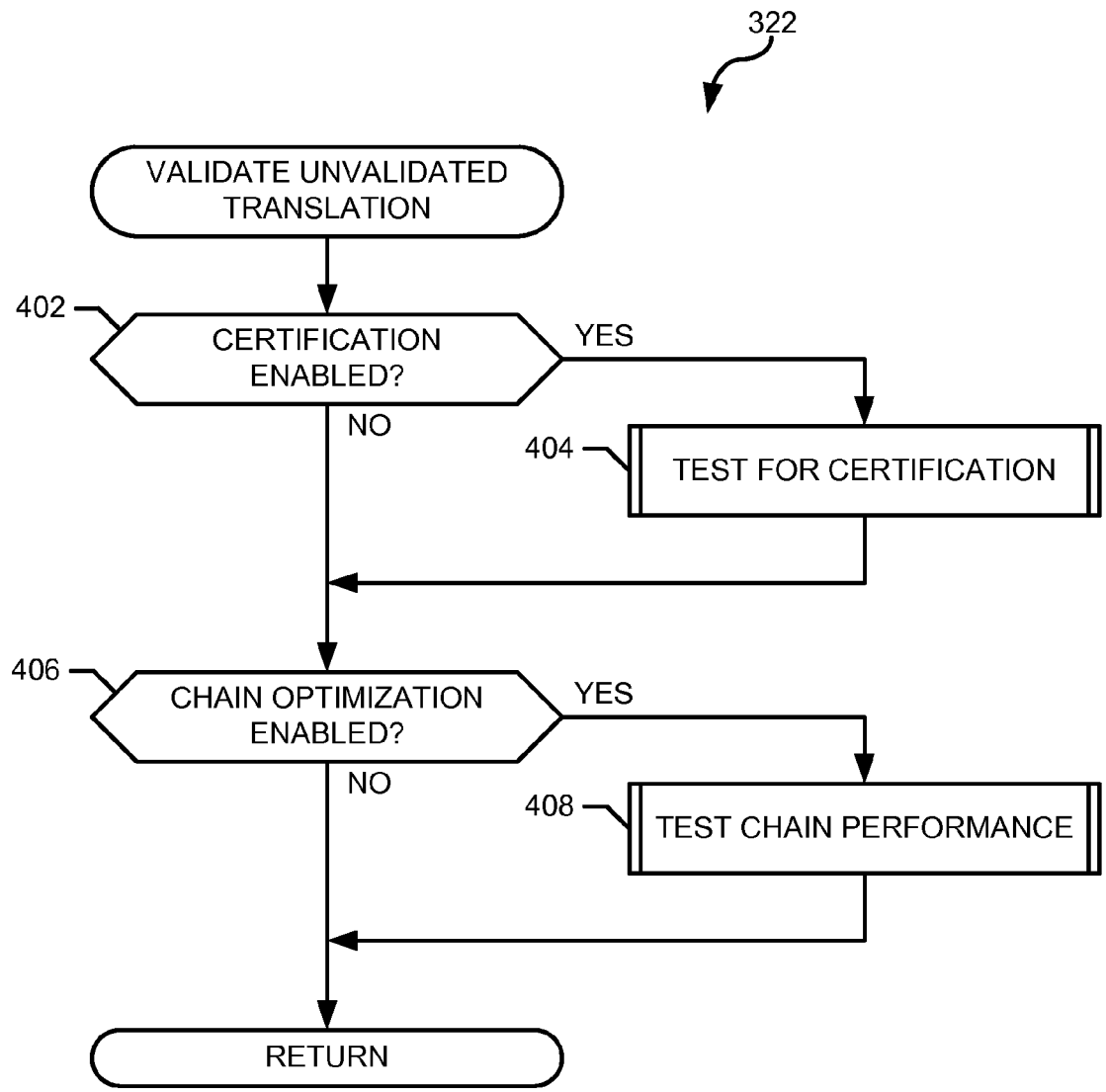

The program of FIG. 4 illustrates an example method of validating a translation (e.g., a translated block). The example program of FIG. 4 may be used to implement block 322 of FIG. 3. When the validator 208 determines that there are no state divergences between the translated block 130 and the translated block 132, at block 316 of FIG. 3, the validator 208 validates the translated block 132. At block 402, the certifier 210 determines whether translation certification is enabled. For example, the certifier 210 may check a certification setting from the example flow controller 124 of FIG. 1. If, at block 402, translation certification is enabled, then, at block 404, the certifier 210 tests the validated and uncertified translation (e.g., the example translated block 132) for certification, as described below in connection with FIG. 5. After the certifier 210 tests the translated block for certification at block 404 or if the certification setting is determined to be disabled at block 402, then, at block 406, the chain optimizer 212 determines whether chain optimization is enabled. For example, the chain optimizer 212 may check a chain optimization setting from the example flow controller 124 of FIG. 1. If, at block 406, the chain optimization setting is enabled, then, at block 408, the chain optimizer 212 tests the validated and higher degree of optimization translation (e.g., the translated block 140) for optimized performance in comparison to the validated and lower degree of optimization translation (e.g., the translated block 138), as described below in connection with FIG. 6. After the chain optimizer 212 tests the translated block 140 for performance optimization at block 408 or if chain optimization setting is determined to be disabled at block 406, control returns to a calling function or process such as the example program of FIG. 3 and the example process of FIG. 4 ends.

Figure 5:
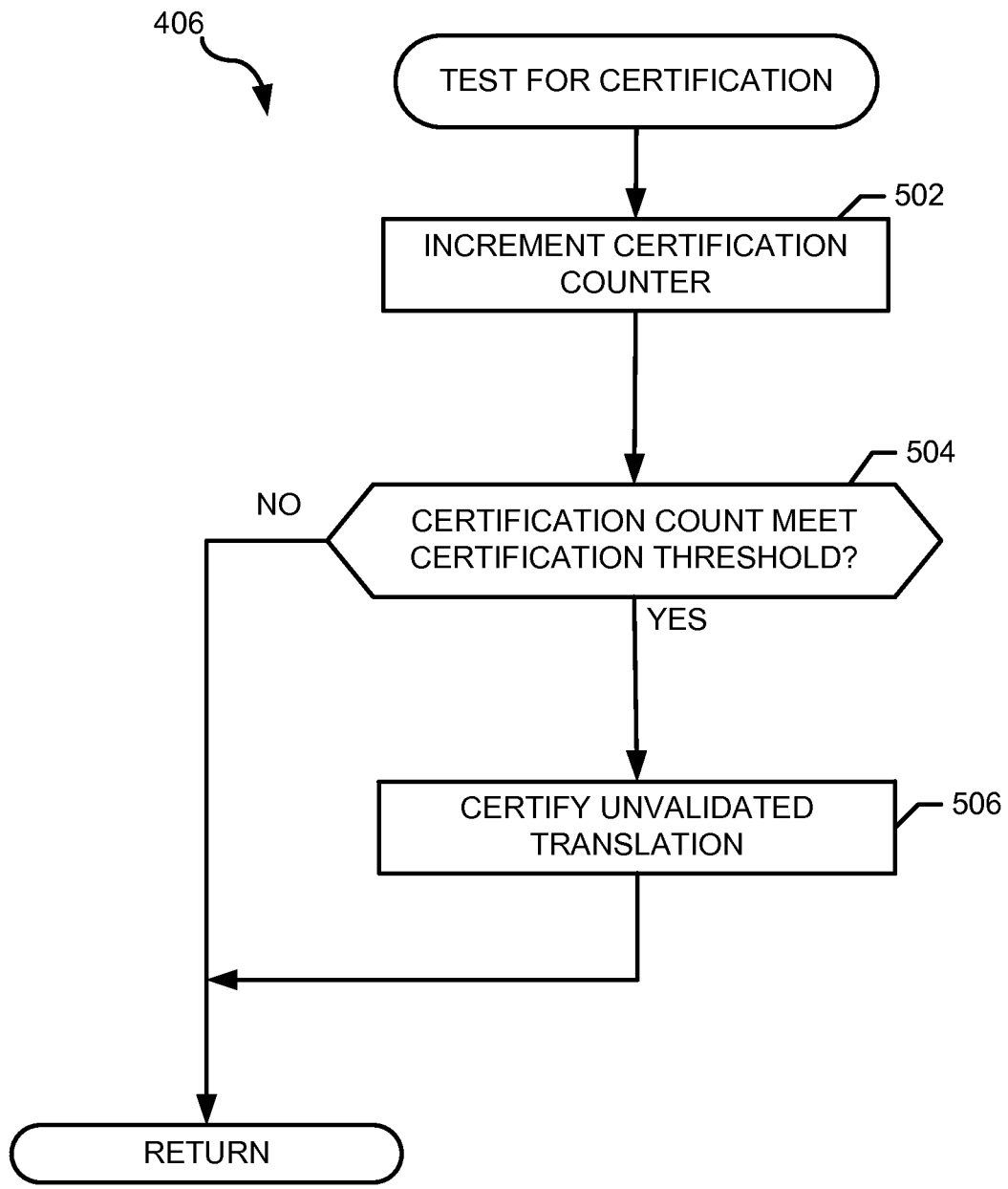

The program of FIG. 5 illustrates an example method of certifying a validated and uncertified translation (e.g., the translated block 134). The example program of FIG. 5 may be used to implement block 404 of FIG. 4. When the example certifier 210 receives a message indicating that translation certification is enabled (e.g., from the example flow controller 124), at block 502, the certifier 210 increments a counter corresponding to a certification count of the validated and uncertified translation. At block 504, the certifier 210 checks if the certification count meets a certification threshold. For example, the certification threshold may be a number of validations before the validated and uncertified translation 134 is certified. In some examples, the certification threshold may be set by a user. In some examples, the certification threshold may be a dynamic number based on, for example, the complexity of the translated block. If, at block 504, the certification count meets the certification threshold, then, at block 506, the validated and uncertified translation 134 is certified. For example, the certifier 210 may indicate to the translation cache manager 214 to discard the previously certified translated block(s). If, however, at block 504, the certification count does not meet the certification threshold or after the translated block 134 is certified at block 506, then control returns to a calling function or process such as the example program of FIG. 4 and the example process of FIG. 5 ends.

As discussed above in connection with FIG. 2, in some examples, the translation verifier 128 may include a chain optimizer 212 to determine whether executing a chain of guest instructions and/or translated blocks of translated guest instructions with a higher degree of optimization translation improves performance of the execution chain in comparison to a lower degree of optimization translation. That is, in some examples, the translator 112 may optimize a block for a specific optimization(s), which may not result in improved performance of the execution chain. Unlike prior systems that discard a lower degree of optimization translation when a new translation is translated, the example translation verifier 128 of FIG. 2 retains both translation versions (e.g., the higher and the lower degree of optimization translations). Thus, the performance of both translation versions may be compared to determine whether a new translated block (e.g., the higher degree of optimization translation) improves performance of the execution chain.

Figure 6:
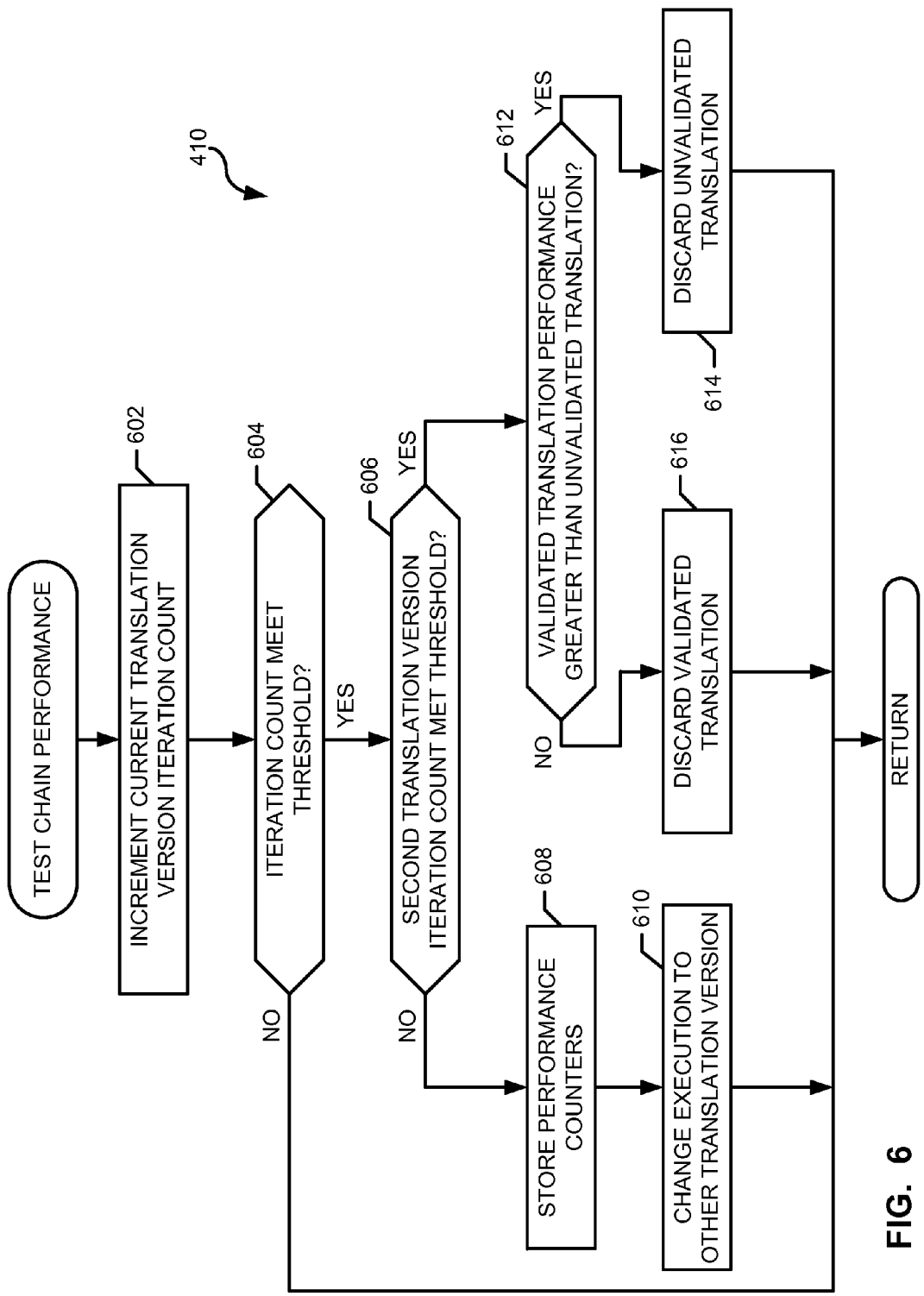

The program of FIG. 6 illustrates an example method of testing chain optimization of a validated translation (e.g., the example translated block 140) in an execution chain of guest instructions and/or translated blocks. The example program of FIG. 6 may be used to implement block 408 of FIG. 4. When the chain optimizer 212 receives a message indicating that chain optimization is enabled (e.g., from the example flow controller 124), at block 602, the chain optimizer 212 increments a counter corresponding to an iteration count of the currently tested translation version (T1). At block 604, the chain optimizer 212 checks if an iteration count for the currently tested translation (T1) meets a threshold. For example, the threshold may be a number set by a user. If, at block 604, the iteration count for the currently tested translation (T1) does not meet the threshold, then, control returns to a calling function or process such as the example program of FIG. 4 and the example process of FIG. 6 ends.

Otherwise, if, at block 604, the iteration count for the currently tested translation (T1) meets the threshold, then, at block 606, the chain optimizer 212 checks whether an iteration count for the equivalent translation (T2), as identified from the information maintained by the translations versions manager 204, has also met the threshold. That is, if the currently tested translation is the translated block 140, then the chain optimizer 212 checks whether the translated block 138, which is equivalent to translated block 140 but with lower optimizations, has also been executed the threshold number of times. If, at block 606, the equivalent translation (T2) has not been executed the threshold number of times, then, at block 608, the chain optimizer 212 stores performance counter values for the currently tested translation (T1) and updates the example chain map 126 to execute T2 instead of T1. In some examples, the performance counters may be selected by a user and may include, for example, performance counters associated with execution speeds. The performance counter values may be stored in the state storage 206. Control then returns to a calling function or process such as the example program of FIG. 4 and the example process of FIG. 6 ends.

In contrast, if, at block 606, the equivalent translation (T2) has been executed the threshold number of times (i.e. both T1 and T2 have been executed the threshold number of times), then, at block 612, the chain optimizer 212 determines the translation whose execution results in improved performance and instructs the translation cache manager 214 to discard the lower performing translation. For example, the chain optimizer 212 may retrieve the respective performance counter values for T1 and T2 from the state storage 206 and compare the values. In some examples, when the performance of equivalent translation (T2) is higher, then, at block 614, the chain optimizer 212 instructs the translation cache manager 214 to discard T1 and updates the chain map 126 to execute T2. If, on the other hand, the performance of the currently tested translation (T1) is higher, then, at block 614, the chain optimizer 212 instructs the translation cache manager 214 to discard T2. Control then returns to a calling function or process such as the example program of FIG. 4 and the example process of FIG. 6 ends.

If, however, at block 612, the validated and lower degree of optimization translation 138 does not outperform the validated and higher degree of optimization translation 140 (e.g., the translated block 140 performance counter values indicate the same or improved performance in comparison to the translated block 138 performance counter values), then, at block 616, the chain optimizer 212 instructs the translation cache manager 214 to discard the translated block 138 and to retain the translated block 140 (e.g., the validated and higher degree of optimization translation) in the example translation cache 120. Control then returns to a calling function or process such as the example program of FIG. 4 and the example process of FIG. 6 ends.

Figure 7:
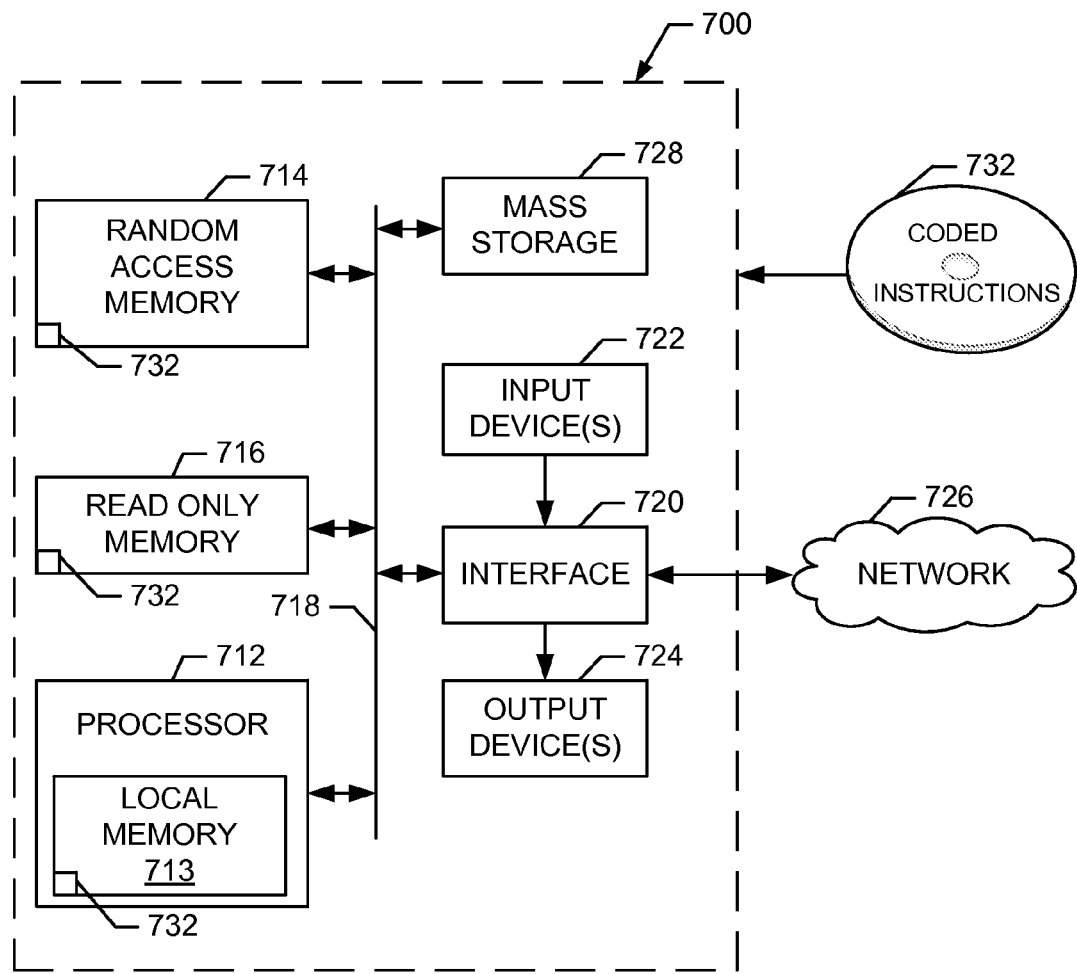
FIG. 7 is a schematic illustration of an example processor platform that may execute the instructions of FIGS. 3-6 to implement the example systems and apparatus of FIGS. 1 and/or 2.

FIG. 7 is a block diagram of an example processor platform 700 capable of executing the instructions of FIGS. 3-6 to implement the dynamic binary translator 100 of FIG. 1. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 3-6 may be stored in the mass storage device 728, in the volatile memory 714, in the non-volatile memory 716, and/or on a removable tangible computer readable storage medium such as a CD or DVD.

A first disclosed example apparatus to validate translated guest code in a dynamic binary translator includes a translator to generate a first translation of code to execute on a host machine, the first translation of the guest code to facilitate creating a first translated guest code, and the translator to generate a second translation of the translated guest code to execute on the host machine, a translation versions manager to identify a first host machine state based on executing a portion of the first translation, and the translation versions manager to identify a second host machine state based on executing a portion of the second translation, and a validator to determine a state divergence status of the second translation based on a comparison between the first host machine state and the second host machine state.

In a second disclosed example apparatus and/or the first disclosed example apparatus, the translator is to identify an executed instruction in the first translated guest code, identify a block of instructions that is to include the executed instruction, and insert a commit instruction at the end of the block.

In a third disclosed example apparatus, the second disclosed example apparatus and/or the first disclosed example apparatus, the apparatus further includes a host instruction executor to execute a portion of the first translation, and the translation versions manager is to identify system state information of the host machine prior to the host instruction executor executing the first translation, and the translation versions manager to identify the first host machine state at the end of the first translation execution.

In a fourth disclosed example apparatus, the third disclosed example apparatus, the second disclosed example apparatus and/or the first disclosed example apparatus, the translation versions manager is to load the system state information of the host machine, and identify the second host machine state in response to the host instruction executor executing a portion of the second translation.

In a fifth disclosed example apparatus, the fourth disclosed example apparatus, the third disclosed example apparatus, the second disclosed example apparatus and/or the first disclosed example apparatus, the guest code is a previously translated guest code.

In a sixth disclosed example apparatus, the fifth disclosed example apparatus, the fourth disclosed example apparatus, the third disclosed example apparatus, the second disclosed example apparatus and/or the first disclosed example apparatus, the apparatus further includes a certifier to increment a certification count for the second translation when a state divergence is not detected, compare the certification count to a first threshold, and certify the second translation based on the comparison.

In a seventh disclosed example apparatus, the sixth disclosed example apparatus, the fourth disclosed example apparatus, the third disclosed example apparatus, the second disclosed example apparatus and/or the first disclosed example apparatus, the apparatus further includes a chain optimizer to update an execution chain to include the first translation, increment a first iteration count when the first translation is executed, identify a first performance counter that is to correspond to the first translation, update the execution chain to include the second translation, increment a second iteration count when the second translation is executed, compare the first performance counter to a second performance counter that is to correspond to the second translation, and based on the comparison, discard the second translation when the first performance counter is greater than the second performance counter.

An eighth disclosed example apparatus includes a translator to generate a first translation of guest code to execute on a host machine, the first translation of the guest code to facilitate creating a first translated guest code, and the translator to generate a second translation of the translated guest code to execute on the host machine, and a chain optimizer to update an execution chain to include the first translation, identify a first translation performance counter when a first iteration count that is to correspond to executing the first translation meets a first threshold, update the execution chain to include the second translation, identify a second translation performance counter when a second iteration count that is to correspond to executing the second translation meets a second threshold, compare the first translation performance counter to the second translation performance counter, and based on the comparison, discard the second translation when the first performance counter is greater than the second performance counter.

In ninth disclosed example apparatus and/or the eighth disclosed example apparatus, the chain optimizer is to discard the first translation when the second translation performance counter is the same as the first translation performance counter.

In a tenth disclosed example apparatus, the ninth disclosed example apparatus and/or the eighth disclosed example apparatus, the first translation performance counter is greater than the second translation performance counter when the comparison indicates first translation execution outperforms second translation execution.

In an eleventh disclosed example apparatus, the tenth disclosed example apparatus, the ninth disclosed example apparatus and/or the eighth disclosed example apparatus, the guest code is a previously translated guest code.

In a twelfth disclosed example apparatus, the eleventh disclosed example apparatus, the tenth disclosed example apparatus, the ninth disclosed example apparatus and/or the eighth disclosed example apparatus, the translator is to identify an executed instruction in the first translated guest code, identify a block of instructions that is to include the executed instruction, and insert a commit instruction at the end of the block.

In a thirteenth disclosed example apparatus, the twelfth disclosed example apparatus, the eleventh disclosed example apparatus, the tenth disclosed example apparatus, the ninth disclosed example apparatus and/or the eighth disclosed example apparatus, the apparatus further includes a translation versions manager to identify a first host machine state based on executing a portion of the first translation, and the translation versions manager to identify a second host machine state based on executing a portion of the second translation, and a validator to determine a state divergence status of the second translation based on a comparison between the first host machine state and the second host machine state.

In a fourteenth disclosed example apparatus, the thirteenth disclosed example apparatus, the twelfth disclosed example apparatus, the eleventh disclosed example apparatus, the tenth disclosed example apparatus, the ninth disclosed example apparatus and/or the eighth disclosed example apparatus, the apparatus further includes a host instruction executor to execute a portion of the first translation, and the translation versions manager is to store system state information of the host machine prior to the host instruction executor executing the first translation portion, and the translation versions manager to identify the first host machine state at the end of the first translation portion execution In a fifteenth disclosed example apparatus, the fourteenth disclosed example apparatus, the thirteenth disclosed example apparatus, the twelfth disclosed example apparatus, the eleventh disclosed example apparatus, the tenth disclosed example apparatus, the ninth disclosed example apparatus and/or the eighth disclosed example apparatus, the translation versions manager is to load the system state information of the host machine, and identify the second host machine state in response to the host instruction executor executing a portion of the second translation.

A first disclosed example method to validate translated guest code in a dynamic binary translator includes generating a first translation of guest code to execute on a host machine, the first translation of the guest code to facilitate creating a first translated guest code, generating a second translation of the translated guest code to execute on the host machine, identifying a first host machine state based on executing a portion of the first translation, identifying a second host machine state based on executing a portion of the second translation, and determining a state divergence status of the second translation based on a comparison between the first host machine state and the second host machine state.

In a second disclosed example method and/or the first disclosed example method, generating the first translation further includes identifying an executed instruction in the first translated guest code, identifying a block of instructions that includes the executed instruction, and inserting a commit instruction at the end of the block.

In a third disclosed example method, the second disclosed example method and/or the first disclosed example method, identifying the first machine host state further includes storing system state information of the host machine, executing a portion of the first translation, and identifying the first host machine state at the end of the first translation execution.

In a fourth disclosed example method, the third disclosed example method, the second disclosed example method and/or the first disclosed example method, the first translation execution ends before a commit instruction is executed.

In a fifth disclosed example method, the fourth disclosed example method, the third disclosed example method, the second disclosed example method and/or the first disclosed example method, identifying the second host machine state further includes loading the system state information of the host machine, executing a portion of the second translation, and identifying the second host machine state at the end of the second translation execution.

In a sixth disclosed example method, the fifth disclosed example method, the fourth disclosed example method, the third disclosed example method, the second disclosed example method and/or the first disclosed example method, the second translation execution ends before a commit instruction is executed.

In a seventh disclosed example method, the sixth disclosed example method, the fifth disclosed example method, the fourth disclosed example method, the third disclosed example method, the second disclosed example method and/or the first disclosed example method, the guest code is a previously translated guest code.

In an eighth disclosed example method, the seventh disclosed example method, the sixth disclosed example method, the fifth disclosed example method, the fourth disclosed example method, the third disclosed example method, the second disclosed example method and/or the first disclosed example method, a state divergence is detected when the first host machine state differs from the second host machine state.

In a ninth disclosed example method, the eighth disclosed example method, the seventh disclosed example method, the sixth disclosed example method, the fifth disclosed example method, the fourth disclosed example method, the third disclosed example method, the second disclosed example method and/or the first disclosed example method, the method further includes incrementing a certification count for the second translation when a state divergence is not detected, comparing the certification count to a first threshold, and certifying the second translation based on the comparison.

In a tenth disclosed example method, the ninth disclosed example method, the eighth disclosed example method, the seventh disclosed example method, the sixth disclosed example method, the fifth disclosed example method, the fourth disclosed example method, the third disclosed example method, the second disclosed example method and/or the first disclosed example method, the method further includes discarding the first translation.

In an eleventh disclosed example method, the tenth disclosed example method, the ninth disclosed example method, the eighth disclosed example method, the seventh disclosed example method, the sixth disclosed example method, the fifth disclosed example method, the fourth disclosed example method, the third disclosed example method, the second disclosed example method and/or the first disclosed example method, the method further includes updating an execution chain to include the first translation, executing the first translation until a second threshold is met, identifying a first performance counter corresponding to the first translation, updating the execution chain to include the second translation, executing the second translation until a third threshold is met, comparing the first performance counter to a second performance counter corresponding to the second translation, and based on the comparison, discarding the second translation when the first performance counter is greater than the second performance counter.

In a twelfth disclosed example method, the eleventh disclosed example method, the tenth disclosed example method, the ninth disclosed example method, the eighth disclosed example method, the seventh disclosed example method, the sixth disclosed example method, the fifth disclosed example method, the fourth disclosed example method, the third disclosed example method, the second disclosed example method and/or the first disclosed example method, the method further includes discarding the first translation when the second performance counter is the same as the first performance counter.

In a thirteenth disclosed example method, the twelfth disclosed example method, the eleventh disclosed example method, the tenth disclosed example method, the ninth disclosed example method, the eighth disclosed example method, the seventh disclosed example method, the sixth disclosed example method, the fifth disclosed example method, the fourth disclosed example method, the third disclosed example method, the second disclosed example method and/or the first disclosed example method, the first performance counter is greater than the second performance counter when the comparison indicates executing the first translation outperforms executing the second translation.

A first disclosed example tangible computer readable storage medium has instructions stored thereon that, when executed, cause a machine to at least generate a first translation of guest code to execute on a host machine, the first translation of the guest code to facilitate creating a first translated guest code, generate a second translation of the translated guest code to execute on the host machine, identify a first host machine state based on executing a portion of the first translation, identify a second host machine state of the host machine based on executing a portion of the second translation, and determine a state divergence status of the second translation based on a comparison between the first host machine state and the second host machine state.

In a second disclosed example storage medium and/or the first disclosed example storage medium, the instructions cause the machine to identify an executed instruction in the first translated guest code, identify a block of instructions that includes the executed instruction, and insert a commit instruction at the end of the block.

In a third disclosed example storage medium, the second disclosed example storage medium and/or the first disclosed example storage medium, the instructions cause the machine to store system state information of the host machine, execute a portion of the first translation, and identify the first host machine state at the end of the first translation execution.

In a fourth disclosed example storage medium, the third disclosed example storage medium, the second disclosed example storage medium and/or the first disclosed example storage medium, the instructions cause the machine to load the system state information of the host machine, execute a portion of the second translation, and identify the second host machine state at the end of the second translation execution.

In a fifth disclosed example storage medium, the fourth disclosed example storage medium, the third disclosed example storage medium, the second disclosed example storage medium and/or the first disclosed example storage medium, the instructions cause the machine to increment a certification count for the second translation when a divergence is not detected, compare the certification count to a first threshold, and certify the second translation based on the comparison.

In a sixth disclosed example storage medium, the fifth disclosed example storage medium, the fourth disclosed example storage medium, the third disclosed example storage medium, the second disclosed example storage medium and/or the first disclosed example storage medium, the instructions cause the machine to update an execution chain to include the first translation, execute the first translation until a second threshold is met, identify a first performance counter corresponding to the first translation, update the execution chain to include the second translation, execute the second translation until a third threshold is met, compare the first performance counter to a second performance counter corresponding to the second translation, and based on the comparison, discard the second translation when the first performance counter is greater than the second performance counter.

In a first disclosed example system, the system includes means for generating a first translation of guest code to execute on a host machine, the first translation of the guest code to facilitate creating a first translated guest code, means for generating a second translation of the translated guest code to execute on the host machine, means for identifying a first host machine state based on executing a portion of the first translation, means for identifying a second host machine state based on executing a portion of the second translation, and means for determining a state divergence status of the second translation based on a comparison between the first host machine state and the second host machine state.

In a second disclosed example system and/or the first disclosed example system, the system further includes means for identifying an executed instruction in the first translated guest code, means for identifying a block of instructions that is to include the executed instruction, and means for inserting a commit instruction at the end of the block.

In a third disclosed example system, the second disclosed example system and/or the first disclosed example system, the system further includes means for executing a portion of the first translation, means for storing system state information of the host machine prior to executing the first translation, and means for identifying the first host machine state at the end of the first translation execution.

In a fourth disclosed example system, the third disclosed example system, the second disclosed example system and/or the first disclosed example system, the system further includes means for loading the system state information of the host machine, means for executing a portion of the second translation, and means for identifying the second host machine state in response to the means for executing portion of the second translation.

In a fifth disclosed example system, the fourth disclosed example system, the third disclosed example system, the second disclosed example system and/or the first disclosed example system, the system further includes means for incrementing a certification count for the second translation when a state divergence is not detected, means for comparing the certification count to a first threshold, and means for certifying the second translation based on the means for comparing.

In a sixth disclosed example system, the fifth disclosed example system, the fourth disclosed example system, the third disclosed example system, the second disclosed example system and/or the first disclosed example system, the system further includes means for updating an execution chain to include the first translation, means for incrementing a first iteration count when the first translation is executed, means for identifying a first performance counter that is to correspond to the first translation, means for updating the execution chain to include the second translation, means for incrementing a second iteration count when the second translation is executed, means for comparing the first performance counter to a second performance counter that is to correspond to the second translation, and based on the comparison, means for discarding the second translation when the first performance counter is greater than the second performance counter.

From the foregoing, it will appreciate that the above disclosed methods, apparatus and articles of manufacture improve co-simulation speeds, enable certifying translated code, identify inefficient translations and improve execution reliability in the presence of one or more transient or hardware faults.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to validate translated guest code in a dynamic binary translator, comprising:
   a memory to store executable instructions that when executed by a processor causes:
   a translator to generate a first translation of guest code to execute on a host machine, the first translation of the guest code to facilitate creating a first translated guest code, and the translator to generate a second translation of the translated guest code to execute on the host machine;
   a translation versions manager to identify a first host machine state based on execution of a portion of the first translation, and the translation versions manager to identify a second host machine state based on execution of a portion of the second translation; and
   a validator to determine a state divergence status of the second translation based on a comparison between the first host machine state and the second host machine state;
   a chain optimizer to:
      update an execution chain to include the first translation;
      increment a first iteration count when the first translation is executed;
      identify a first performance counter that corresponds to the first translation;
      update the execution chain to include the second translation;
      increment a second iteration count when the second translation is executed;
      compare the first performance counter to a second performance counter that corresponds to the second translation; and
      based on the comparison, discard the second translation when the first performance counter is greater than the second performance counter.

2. An apparatus as described in claim 1, wherein the translator is to:
   identify an executed instruction in the first translated guest code;
   identify a block of instructions that is to include the executed instruction; and
   insert a commit instruction at the end of the block.

3. An apparatus as described in claim 1, further including:
   a host instruction executor to execute a portion of the first translation wherein the translation versions manager is to identify system state information of the host machine prior to the host instruction executor executing the first translation, and the translation versions manager is to identify the first host machine state at the end of the first translation execution.

4. An apparatus as described in claim 3, wherein the translation versions manager is to:
   load the system state information of the host machine; and
   identify the second host machine state in response to the host instruction executor executing a portion of the second translation.

5. An apparatus as described in claim 1, wherein the guest code is a previously translated guest code.

6. An apparatus as described in claim 1, further including a certifier to:
   increment a certification count for the second translation when a state divergence is not detected;
   compare the certification count to a first threshold; and
   certify the second translation based on the comparison.

7. A method to validate translated guest code in a dynamic binary translator, the method comprising:
   generating a first translation of guest code to execute on a host machine, the first translation of the guest code to facilitate creating a first translated guest code;
   generating a second translation of the translated guest code to execute on the host machine;
   identifying a first host machine state based on execution of a portion of the first translation;
   identifying a second host machine state based on execution of a portion of the second translation; and
   determining a state divergence status of the second translation based on a comparison between the first host machine state and the second host machine state;
   updating, with a processor, an execution chain to include the first translation;
   executing the first translation until a second threshold is met;
   identifying, with the processor, a first performance counter corresponding to the first translation;
   updating, with the processor, the execution chain to include the second translation;
   executing the second translation until a third threshold is met;
   comparing, with the processor, the first performance counter to a second performance counter corresponding to the second translation; and
   based on the comparison, discarding, with the processor, the second translation when the first performance counter is greater than the second performance counter.

8. A method as described in claim 7, wherein the generating of the first translation further includes:
   identifying an executed instruction in the first translated guest code;
   identifying a block of instructions that includes the executed instruction; and
   inserting a commit instruction at the end of the block.

9. A method as described in claim 7, wherein the identifying of the first machine host state further includes:
   storing system state information of the host machine;
   executing a portion of the first translation; and
   identifying the first host machine state at the end of the first translation execution.

10. A method as described in claim 9, wherein the identifying of the second host machine state further includes:
    loading the system state information of the host machine;
    executing a portion of the second translation; and
    identifying the second host machine state at the end of the second translation execution.

11. A method as described in claim 7, wherein the guest code is a previously translated guest code.

12. A method as described in claim 7, further including:
incrementing a certification count for the second translation when a state divergence is not detected;
comparing the certification count to a first threshold; and
certifying the second translation based on the comparison.

13. A tangible computer readable storage medium comprising instructions that, when executed, cause a machine to at least:
generate a first translation of guest code to execute on a host machine, the first translation of the guest code to facilitate creating a first translated guest code;
generate a second translation of the translated guest code to execute on the host machine;
identify a first host machine state based on execution of a portion of the first translation;
identify a second host machine state of the host machine based on execution of a portion of the second translation; and
determine a state divergence status of the second translation based on a comparison between the first host machine state and the second host machine state;
update an execution chain to include the first translation;
execute the first translation until a second threshold is met;
identify a first performance counter corresponding to the first translation;
update the execution chain to include the second translation;
execute the second translation until a third threshold is met;
compare the first performance counter to a second performance counter corresponding to the second translation; and
based on the comparison, discard the second translation when the first performance counter is greater than the second performance counter.

14. A storage medium as described in claim 13, wherein the instructions cause the machine to:
identify an executed instruction in the first translated guest code;
identify a block of instructions that includes the executed instruction; and
insert a commit instruction at the end of the block.

15. A storage medium as described in claim 13, wherein the instructions cause the machine to:
increment a certification count for the second translation when a state divergence is not detected;
compare the certification count to a first threshold; and
certify the second translation based on the comparison.

16. A storage medium as described in claim 13, wherein the instructions cause the machine to:
store system state information of the host machine;
execute a portion of the first translation; and
identify the first host machine state at the end of the first translation execution.

17. A storage medium as described in claim 16, wherein the instructions cause the machine to:
load the system state information of the host machine;
execute a portion of the second translation; and
identify the second host machine state at the end of the second translation execution.

* * * * *